United States Patent [19]

Andrei

[11] Patent Number: 5,293,110
[45] Date of Patent: Mar. 8, 1994

[54] BRIDGE CAPACITOR BANK INSTALLATION

[75] Inventor: Radu G. Andrei, Columbus, Ohio

[73] Assignee: American Electric Power Service Corporation, Columbus, Ohio

[21] Appl. No.: 895,106

[22] Filed: Jun. 8, 1992

[51] Int. Cl.$^5$ .............................................. G05F 1/70
[52] U.S. Cl. ..................................... 323/209; 323/208
[58] Field of Search .............................. 323/208, 209; G05F 1/70

[56] References Cited

U.S. PATENT DOCUMENTS

| | | | |
|---|---|---|---|
| 2,933,652 | 4/1960 | Cuttino | 317/12 |
| 3,248,607 | 4/1966 | Lemens | 317/12 |
| 3,270,246 | 8/1966 | Lemens | 317/12 |
| 3,943,435 | 3/1976 | DeJarnette | 323/76 |
| 3,947,725 | 3/1976 | Lucas | 317/12 |
| 4,329,638 | 5/1982 | Le Maguet | 323/233 |

*Primary Examiner*—Emanuel T. Voeltz
*Attorney, Agent, or Firm*—Michael Sand Co.

[57] ABSTRACT

A capacitor bank installation for generating reactive power in high or extra high voltage electrical power systems, for example 345kV, to maintain the voltage level during heavy loading conditions or system contingencies. A three phase capacitor bank is connected between the high voltage line and the low voltage line by a first switching device which is connected between the high voltage line and the capacitor bank and by a second switching device which is connected between the capacitor bank and the low voltage line. The first switching device is a current interrupting device in series with a motorized disconnect switch which has a lower recovery voltage withstand capability than would be required if switching a shunt capacitor bank connected to the high voltage system. The second switching device is a motorized disconnect switch without any current interrupting capability.

8 Claims, 3 Drawing Sheets

BRIDGE CAPACITOR BANK INSTALLATION

BACKGROUND OF THE INVENTION

1. Technical Field

The invention relates to a capacitor bank installation for generating reactive power in high or extra high voltage electrical power systems. In particular, the invention relates to such a capacitor bank installation on which capacitors are connected between a three phase high voltage power line and a three phase lower voltage power line replacing the heretofore high voltage shunt capacitor bank installations enabling less expensive switching devices to be utilized. The two voltage systems associated with the three phase high voltage and low voltage power lines are in phase.

2. Background Information

Shunt capacitor banks are normally used to generate reactive power in high or extra high voltage electrical power systems to maintain the normal voltage level during heavy loading conditions or system contingencies. Above 300kV, it is very difficult, if not impossible, to find a switching device with a voltage rating close to the system operating voltage to be able to switch ungrounded wye shunt capacitor banks. Shunt capacitor banks above 300kV are grounded wye installations which are easier to switch. The grounded wye operation of the high voltage shunt capacitor banks dictated by the limited capability of the switching devices, has negative effects upon the electrical power system and equipment performance.

Electrical power system and equipment problems associated with grounded wye shunt capacitor bank operations can be summarized as follows:

Increased zero sequence harmonic current circulation in the electrical power system which produce additional losses and may create magnetic interference with the telephone lines.

Introduction of high magnitude/high frequency inrush currents into the station ground grid during bank energization which may produce misoperation or failure of the sensitive electronic equipment.

Discharge of electric energy stored in the capacitor bank into close-in line-to-ground faults on the transmission lines which create additional I$^2$t duty on the line circuit breakers.

Introduction of ground current circulation during capacitor bank unbalance operation which may result in the false operation of some type of sensitive ground fault detection relays.

Prior art examples of shunt capacitor bank installations are shown in U.S. Pat. Nos. 2,933,652, 3,248,607 and 3,270,246. These and other prior art capacitor banks all are connected to ground or have a floating neutral. U.S. Pat. Nos. 3,943,435, 3,947,725 and 4,329,638 show various other electrical devices for use with usual shunt type capacitor bank installations.

These is no known capacitor bank installation of which I am aware which is connected between high and low voltage power lines for generating reactive power in the high voltage power system and for transferring reactive power to the high voltage electrical power system from the lower voltage electrical power system which is connected thereto.

SUMMARY OF THE INVENTION

One objective of the present invention is to provide a capacitor bank installation which eliminates the negative effects which a high voltage grounded wye shunt capacitor bank has upon the electrical power system and equipment performance.

Another objective of the invention is to provide such a capacitor bank installation which allows for a more extensive use of the reactive power generation facilities already installed in the electrical power system.

A further objective of the invention is to provide a type of capacitor bank installation which for the same total amount of reactive power generated in the high voltage system, is less expensive than a high voltage grounded wye shunt capacitor bank.

Another objective of the invention is to provide such a capacitor bank installation which generates reactive power into a high voltage electrical power system and which can be switched with high voltage switching devices less expensive than the heretofore expensive switching devices required to switch high voltage shunt capacitor bank installations.

A further objective is to provide such a capacitor bank which can be combined with a low voltage ungrounded wye shunt capacitor bank to eliminate the negative effects which a high voltage grounded wye shunt capacitor bank has upon the electrical power system.

Another objective is to provide such a capacitor bank installation which when energized, generates less severe voltage transients in the high voltage system than that generated by a high voltage grounded wye shunt capacitor bank.

A further objective of the invention is to provide such a capacitor bank which when combined with a low voltage shunt capacitor bank provides for a more extensive use of the reactive power generation installed in a lower voltage system by allowing its use also in a higher voltage system when conditions require.

Another objective of the invention is to provide such a capacitor bank which may include a high voltage ungrounded wye shunt capacitor bank connected in two points to the electrical power system being switched in two stages with two inexpensive switching devices having less current interrupting capability than a device needed to switch a high voltage shunt capacitor bank.

These objectives and advantages are obtained by the bridge capacitor bank installation of the present invention which is adapted for use in an electrical power system wherein the three phase bridge capacitor bank is connected between high and low voltage systems which are in phase for generating reactive power into the high voltage system; in which a first switching device rated at the high voltage is connected between the high voltage system and the capacitor bank; and in which a second switching device rated at the low voltage is connected between the capacitor bank and the low voltage system.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
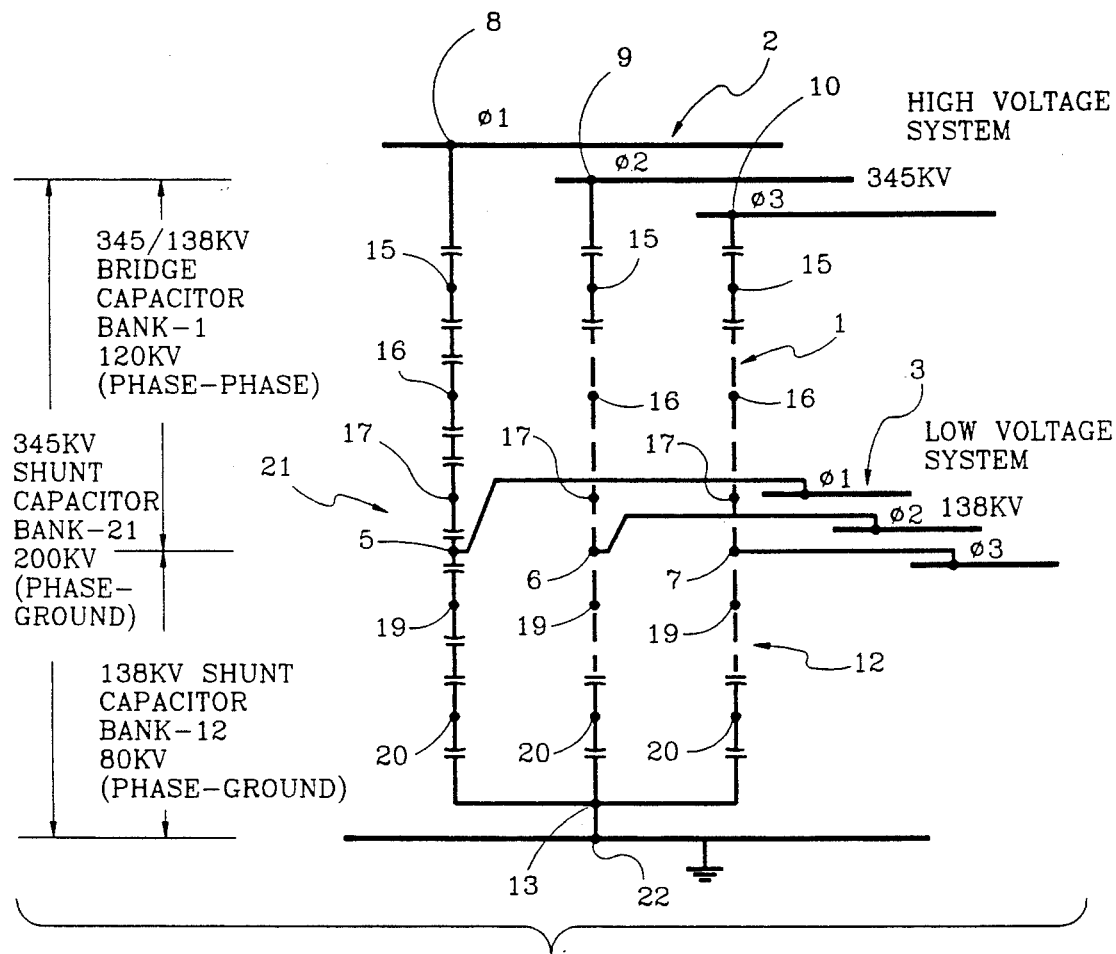
FIG. 1 is a schematic circuit diagram of a bridge capacitor bank installation of the present invention connected between a high voltage system and a low voltage system which are in phase in combination with a conventional low voltage wye shunt capacitor bank.

FIG. 1 is a schematic diagram illustrating one embodiment of the bridge capacitor bank installation of the present invention. The bridge capacitor bank is indicated generally at 1, and is electrically connected to and between a high voltage 345kV system or three phase high voltage power line indicated generally at 2, and a low voltage 138kV system or three phase low voltage power line indicated generally at 3. The two electrical power systems are in phase and capacitor bank 1 is connected at points 5, 6 and 7 to the 138kV system and is connected at points 8, 9 and 10 to the 345kV system.

In the embodiment of FIG. 1, a conventional low voltage 138kV ungrounded wye shunt capacitor bank indicated generally at 12, is connected at points 5, 6 and 7 to the low voltage three phase power system and to a common neutral point 13 which can be connected to the ground 22 if desired. Physically, the bridge capacitor bank 1 consists of a plurality of individual racks 15, 16 and 17 containing the capacitors which are connected in series and extend between high voltage line 2 and low voltage line 3. Physically, a shunt capacitor bank indicated generally at consists of a plurality of racks 19 and 20 connected in series which extend between low voltage line 3 and neutral point 13, which can be connected to the ground 22.

Although the two particular power systems discussed above and shown in the drawings are indicated as 345kV and 138kV, it is readily recognized that the two systems can be 765kV and 345kV, 138kV and 69kV, etc. without effecting the concept of the invention.

In steady-state operation, bridge capacitor bank has a dual effect upon the electrical power system:

1. It generates reactive power ($Q_G$) in the high voltage system 2 in accordance to its MVAR rating.

2. It transfers reactive power ($Q_T$) from the low voltage system 3 to the high voltage system 2 in accordance to its MVAR rating and the two system voltages.

The total amount of reactive power (Q) injected into the high voltage system 2 by bridge capacitor bank installation 1 can be calculated with the formula:

$$Q = Q_G + Q_T = Q_G[1 + V_L/(V_H - V_L)] = Q_G V_H/(V_H - V_L)$$

where $V_H$ and $V_L$ are the operating voltage of the high and low voltage power systems respectively.

The amount of reactive power $Q_T$ that bridge capacitor bank 1 transfers from low voltage system 3 to high voltage system 2 should be available in the low voltage system. If this reactive power is not locally available, then part of the reactive power injected by bridge capacitor bank 1 in the high voltage system is returned to the low voltage system through the local station power transformers.

Should the local station power transformers be out of service, part of the reactive power generated in the high voltage system is returned to the low voltage system through the remote stations power transformers and transmission lines. This is an undesirable situation which should be avoided. The location of the bridge capacitor banks of the present invention in the electrical power system must take into account the availability of reactive power generation at lower voltage level. If reactive generation is not available at the lower voltage level, then low voltage shunt capacitor banks such as bank 12, should be installed in conjunction with capacitor banks 1.

The two voltage systems 2 and 3 which are tied together by bridge capacitor bank 1 are only theoretically in phase. A small amount of real power will flow through bridge capacitor bank 1 from low voltage system 3 to high voltage system 2. Because the real power flow in the bridge capacitor bank is opposite in direction to the real power flow in the transformer, a slight increase in the power transformer loading will occur.

From a practical standpoint, the introduction of bridge capacitor banks 1 does not change the short circuit current level at any location in the electrical power system. The short-circuit impedance of the power transformers is much smaller than the bridge capacitor phase impedance.

In accordance with one of the main features of the invention, de-energization of bridge capacitor bank 1 produces less severe recovery voltage transients across the required switching devices than de-energization of the prior art high voltage shunt capacitor banks. For instance, in absence of restriking, the maximum theoretical recovery voltage across a switching device switching a 345/138kV bridge capacitor bank 1 of the present invention is 338kV peak. By contrast, a switching device switching a grounded wye 345kV shunt capacitor bank must be able to withstand 563kV peak recovery voltage during bank deenergization. Both recovery voltage values are reached in 8.3 milliseconds after current interruption. Because a lower recovery voltage is reached in the same time interval, a slower, less technologically complicated and less expensive switching device can be used to switch a 345/138kV bridge capacitor than for the switching of a 345kV shunt capacitor.

Figure 4:
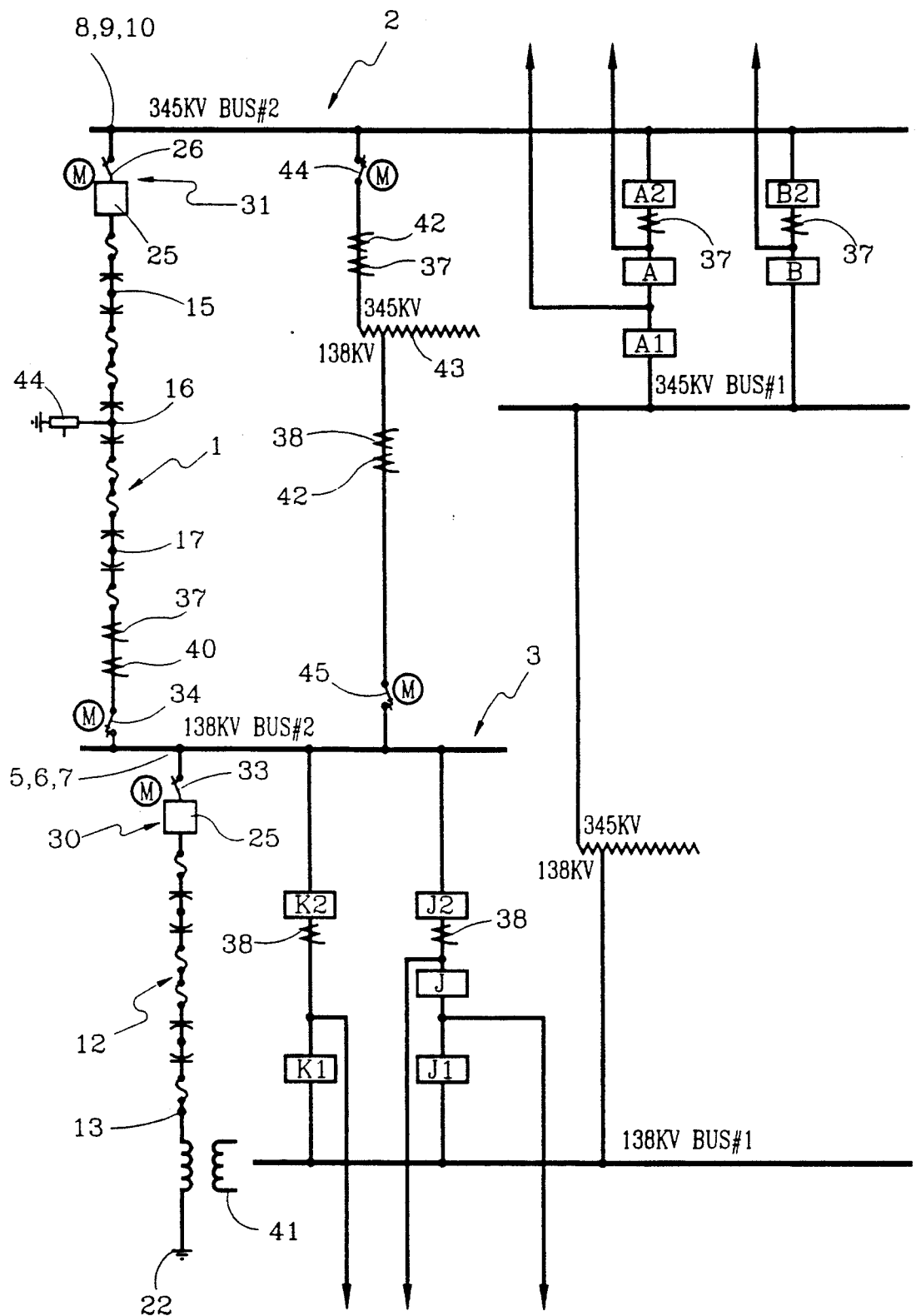
FIG. 4 is a single line schematic of an example of a bridge capacitor bank installation of the present invention and relay protection provided therefore.

As an example, 345/138kV bridge capacitor bank 1 and 138kV shunt capacitor bank 12 (FIG. 4), which would generate the same total amount of reactive power on the 345kV bus as a 345kV shunt capacitor bank which is indicated generally at 21 and illustrated in FIG. 1, can be switched with a first switching device indicated generally at 31, consisting of a 3-gap SF6 type current interrupter 25 in series with a 345kV motorized group operated disconnect switch 26 connected between the capacitor bank and high voltage system 2; and a second switching device indicated generally at 30, equipped with the same 3-gap SF6 interrupter 25 as the 345kV switching device 31, in series with a 138kV motorized group operated disconnect switch 33. Switching device 30 is connected between low voltage system 3 and shunt capacitor bank 12. A motorized 138kV disconnect switch 34 without any current interrupting capability, preferably is connected between bridge capacitor bank 1 and low voltage system 3 to provide physical isolation of capacitor bank 1 for safety purposes. The technical designation of the switching devices 31 and 30 is "circuit switcher."

A prior art 345kV grounded wye shunt capacitor bank 21 as illustrated in FIG. 1, would require for switching, a special purpose 345kV circuit breaker with closing resistors across its contacts, and a 345kV disconnect switch in series with the 345kV circuit breaker. The cost of the two switching devices 30 and 31 on bridge capacitor bank 1 and shunt capacitor bank 12, is approximately 50% of the circuit breaker and disconnect switch on the high voltage 345kV shunt capacitor bank.

It should be mentioned that one of the possible applications of the 345kV circuit switcher 31 listed by its manufacturer is the switching of 230kV grounded wye capacitor banks. Without restriking, the maximum theoretical recovery voltage value across the switching device during de-energization of a 230kV grounded wye shunt capacitor bank is 375kV peak. Since this value is above the 338kV peak value associated with the de-energization of 345/138kV bridge capacitor bank 1, the above proposed application of the 345kV circuit switcher is correct.

As pointed out, to allow for reactive power transfer from low voltage system 3 to high voltage system 2 in certain applications, a low voltage shunt capacitor banks 12 will be installed in conjunction with high/low voltage bridge capacitor bank 1. Two possible switching arrangements of bridge and shunt capacitor banks 1 and 12 located in the same station are shown in FIGS. 2 and 3.

Figure 3:
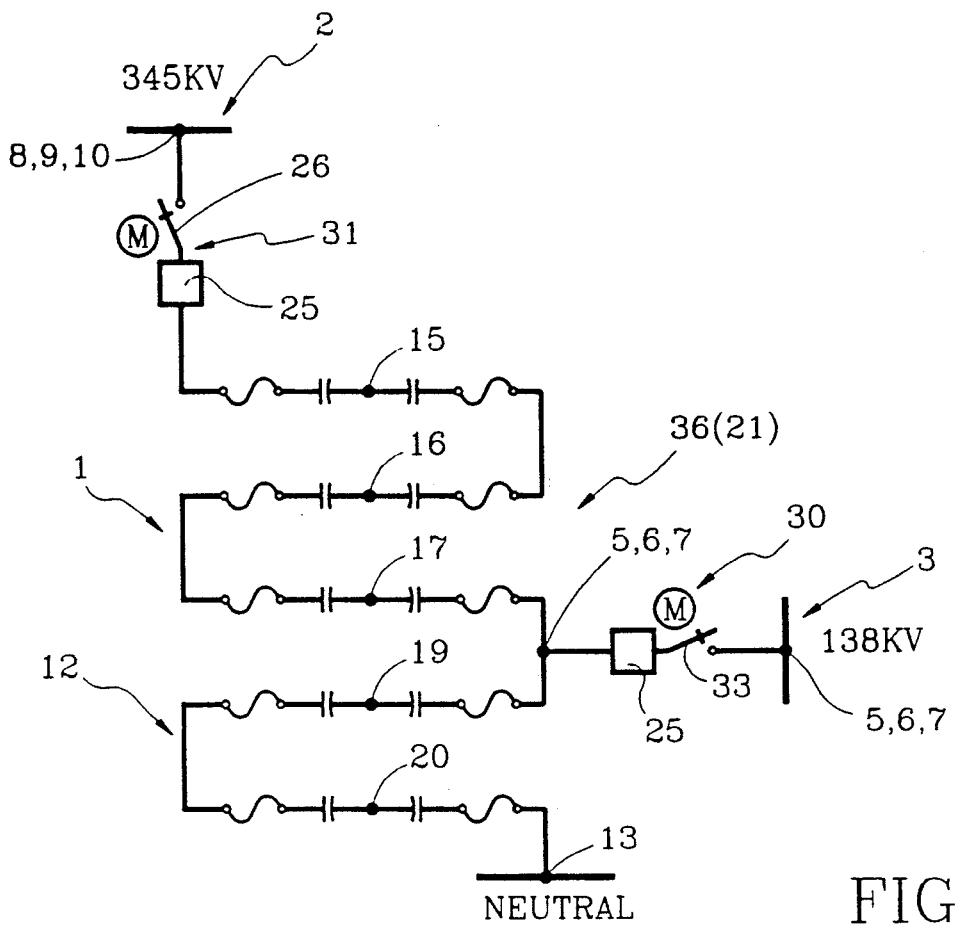
FIG. 3 is a schematic diagram of a second embodiment showing a high voltage ungrounded wye shunt capacitor bank connected in two points to an electrical power system for switching in two stages with two switching devices.

The switching arrangement shown in FIG. 3 is equivalent to an ungrounded wye 345kV shunt capacitor bank 21 connected in two points to the electrical power system. The bridge/shunt capacitor assembly 36 of FIG. 3 is switched in two steps. During energization, the 138kV switching device 30, closes first energizing the shunt capacitor section 12, and the 345kV switching device 31, closes afterwards energizing the bridge capacitor bank section 1. De-energization is done in reverse order. The assembly can not be in service when the 138kV switching device 30 is open or the 138kV line 3 is de-energized. Either condition will transform the assembly 36 into a conventional 345kV ungrounded wye capacitor bank 21 which can not be switched with a 345kV circuit switcher 30. Each capacitor bank section 1 and 12 in the assembly 36, has its own unbalance protection against capacitor can cascading type failure. The operation of the unbalance protection on either bank section removes the entire assembly from service.

Figure 2:
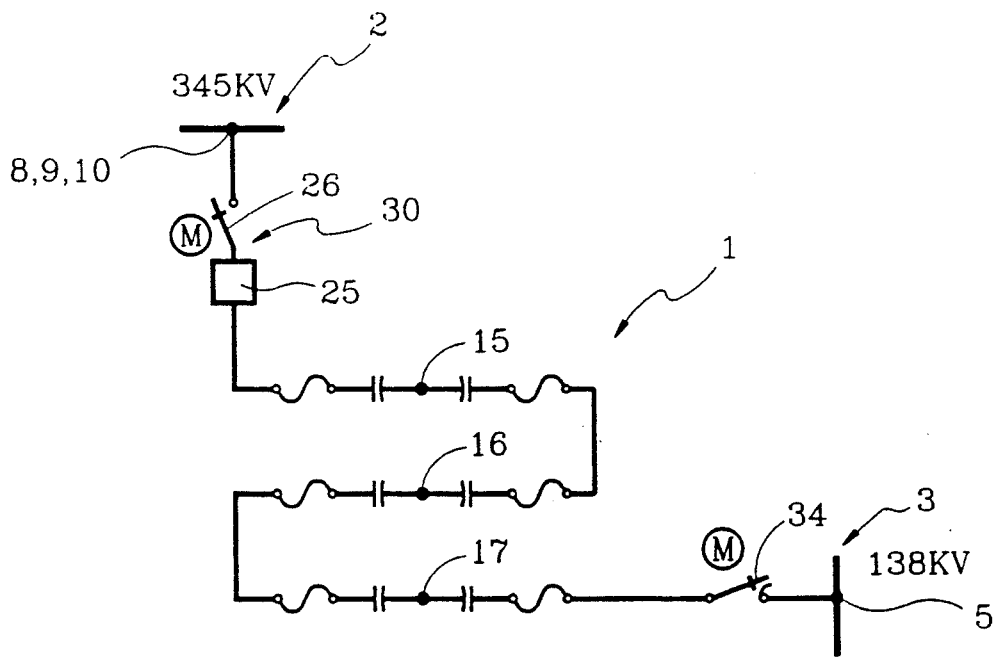
FIG. 2 is a schematic diagram showing the preferred embodiment and switching arrangement for the bridge capacitor bank installation of the present invention.

FIG. 2 illustrates the simplest bridge capacitor bank installation and switching arrangement therefore wherein capacitor bank 1 is connected between high voltage line 2 and low voltage line 3 without any shunt capacitor 12 being connected between low voltage line 3 and neutral 13 or ground 22. In this bridge capacitor bank arrangement, a 345kV switching device 31 as described above, is used in combination with an inexpensive motorized disconnect 34, which is without any interrupting capability. As previously indicated, switching device 31 has a lower recovery voltage withstand capability than would be required if switching a shunt capacitor connected between high voltage system 2 and ground or neutral.

Referring again to FIG. 4, high voltage/low voltage bridge capacitor bank 1 is shown in a single-line diagram in an electrical substation. A low voltage ungrounded wye shunt capacitor bank 12 is also shown. A conceptual relay protection scheme for the entire electrical substation is presented. As the type of differential relays normally used in 345kV bus protection are very sensitive to current unbalance conditions, the bridge capacitor bank current is included in the 345kV bus differential 37.

Because the type of differential relays used in the 138kV bus protection are normally less sensitive to current unbalance conditions, the bridge capacitor bank current is not included in the 138kV bus differential 38. During steady state operation, the sum of bridge and shunt capacitor bank currents with respect to the 138kV bus is zero. Neither current is included in the 138kV bus differential 38.

The voltage unbalance protection relay 44 takes the bridge capacitor bank out of service for multiple capacitor can failures inside the bridge capacitor bank. The 345kV circuit switcher 31 opens first. The 138kV motorized disconnect switch 34 which is inherently slower, opens later to complete the bank isolation.

A current unbalance protection relay 40 takes the bridge capacitor bank out of service for high current magnitude faults inside the bank. Both the 345kV and 138kV No. 2 buses are tripped. The two buses and the power transformer are automatically restored after the bridge capacitor bank is isolated from the power system.

The neutral shift protection relay 41 takes the 138kV shunt capacitor bank 12 out of service for multiple capacitor failures inside the 138kV bank.

Differential relay 42 detects faults inside the transformer 43 and takes the bridge capacitor bank out of service by de-energizing the 345kV and the 138kV buses. After transformer isolation with the two motorized disconnect switches 44 and 45 and restoration of the 345kV and 138kV buses, the bridge capacitor bank can be re-energized on supervisory control. A fault on one of the 345kV or 138kV buses will clear the power transformer by tripping both buses. The bridge capacitor bank is isolated afterwards. The circuit switching device 31 and the motorized disconnect switch 34 open automatically on voltage control. If the bus fault was temporary, the two buses and the transformer are automatically restored. The bridge capacitor bank can be re-energized on supervisory control.

From a system operation reliability standpoint the 345/138kV bridge capacitor bank does not introduce any unacceptable operating conditions. The only difference between a 345/138kV bridge capacitor bank switched with circuit switching device 31 and a 345kV shunt capacitor bank switched with a circuit breaker, is the relay protection operation for high current magnitude faults inside the bank. As shown before, such a fault inside the bridge capacitor bank will temporary remove from service the power transformer. A 345kV grounded wye shunt capacitor installation using a circuit breaker for switching does not require the temporary de-energization of the station power transformer to isolate the faulty capacitor bank. However, it has to be pointed out that high current magnitude faults inside a capacitor bank are very low probability events. The majority of faults inside a capacitor bank are capacitor can failures. For multiple capacitor failures, the voltage unbalance protection 44 will isolate the bridge capacitor bank without temporary removal from service of the station power transformer.

For the same total reactive power generated in the high voltage system, a high voltage/low voltage bridge and a low voltage shunt capacitor assembly is less expensive than a high voltage shunt capacitor installation. As an example it was shown that the two switching devices used to switch 345/138kV bridge capacitor bank 1 and ungrounded wye 138kV shunt bank 12 are less expensive than one switching device for a grounded wye 345kV shunt capacitor bank.

Other savings are generated by the reduced amount of cooper in the station ground grid for the area where bridge and low voltage ungrounded wye shunt capacitor banks are installed. To limit the ground potential rise during energization, a 345kV grounded wye capacitor bank would require a heavy ground grid for the area where the bank is installed. In addition, a grounded wye capacitor bank may require special control cable shielding to limit the transient voltage magnitude during bank energization.

The bridge capacitor installation eliminates the need for surge arresters on the 345kV side of the 345/138kV bridge capacitor bank. The voltage transient generated on the 345kV bus 2 by the energization of bridge capacitor bank 1 are low magnitude/low frequency transient which would not require a surge arrester installation at the capacitor bank 345kV terminals. Station class surge arresters are normally installed at the 345kV grounded wye capacitor bank terminals.

The 345/138kV bridge capacitor installation requires only the use of 138kV voltage class free standing current transformers instead of 345kV current transformers to monitor the 345/138kV bridge capacitor bank current. A 345kV shunt capacitor installation would require 345kV free standing current transformers to monitor the bank current.

Accordingly, the bridge capacitor bank installation provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved bridge capacitor bank installation is constructed and used, the characteristics of the construction, and the advantageous, new and useful results obtained; the new and useful structures, devices, elements, arrangements, parts and combinations, are set forth in the appended claims.

I claim:

1. An electrical power system comprising a three phase high voltage system and a three phase low voltage system in phase with the high voltage system, and a three phase capacitor bank connected between the high and low voltage systems for generating reactive power and for transferring said reactive power only from the low voltage system into the high voltage system.

2. The system defined in claim 1 in which a first switching device is connected between the high voltage system and the capacitor bank, and a second switching device is connected between the capacitor bank and the low voltage system.

3. The system defined in claim 2 in which the first switching device includes a current interrupting device in series with a motorized disconnect switch.

4. The system defined in claim 2 in which the first switching device has a lower recovery voltage withstand capability than would be required if switching a shunt capacitor connected to the high voltage system.

5. The system defined in claim 2 in which the second switching device is a motorized disconnect switch without any current interrupting capability.

6. The system defined in claim 1 in which the reactive power which is transferred from the low voltage system to the high voltage system is in accordance with the VAR rating of the capacitor bank and the voltage of said high and low voltage system.

7. An electrical power system comprising a three phase high voltage system and a three phase low voltage system in phase with the high voltage system, and a high voltage ungrounded wye shunt capacitor bank connected in two points to the high voltage and low voltage systems through two switching devices which when operated have less recovery voltage than a switching device required to switch the same high voltage ungrounded wye capacitor bank in one stage.

8. The system defined in claim 7 in which each of the switching devices includes a current interrupting device in series with a motorized disconnect switch; and in which the current interrupting device has the same current interrupting capability for both switching devices; and in which the motorized disconnect switches have different voltage ratings.

* * * * *